Oct. 31, 1961    M. LOOMIS ET AL    3,006,008
DOCK BOARD CONSTRUCTION USED AS SELF ADJUSTING
BRIDGE BETWEEN TRUCK AND DOCK
Filed Oct. 12, 1956    2 Sheets-Sheet 1
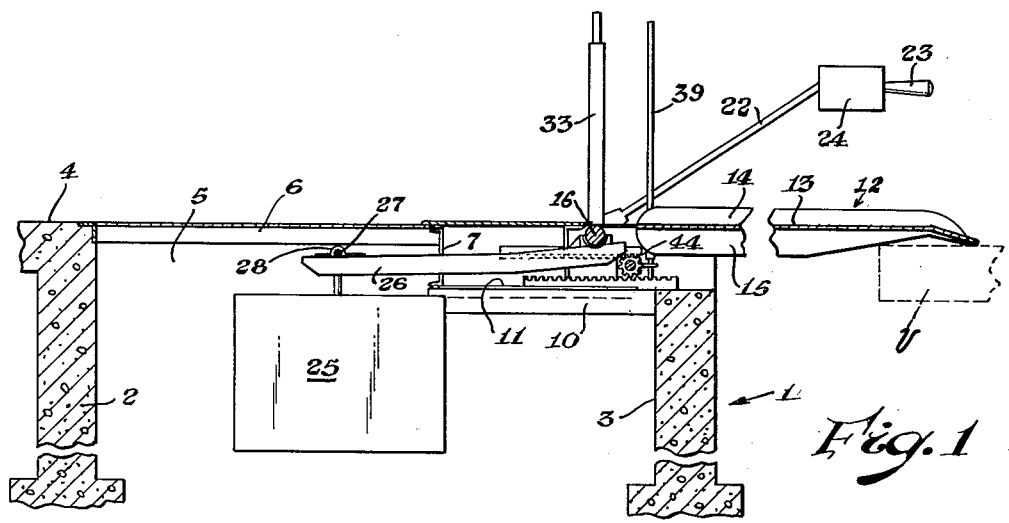
Fig. 1
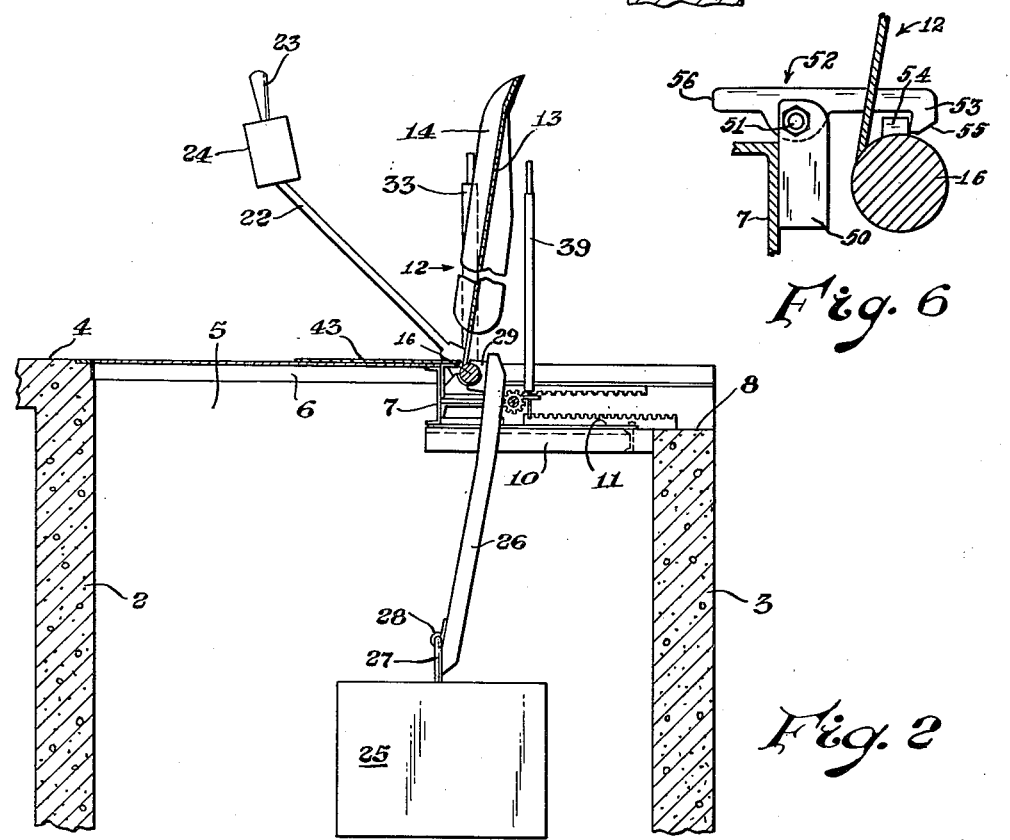
Fig. 6
Fig. 2
INVENTORS.
Martin Loomis
L. M. Abbott
BY
Fearman & Fearman
ATTORNEYS

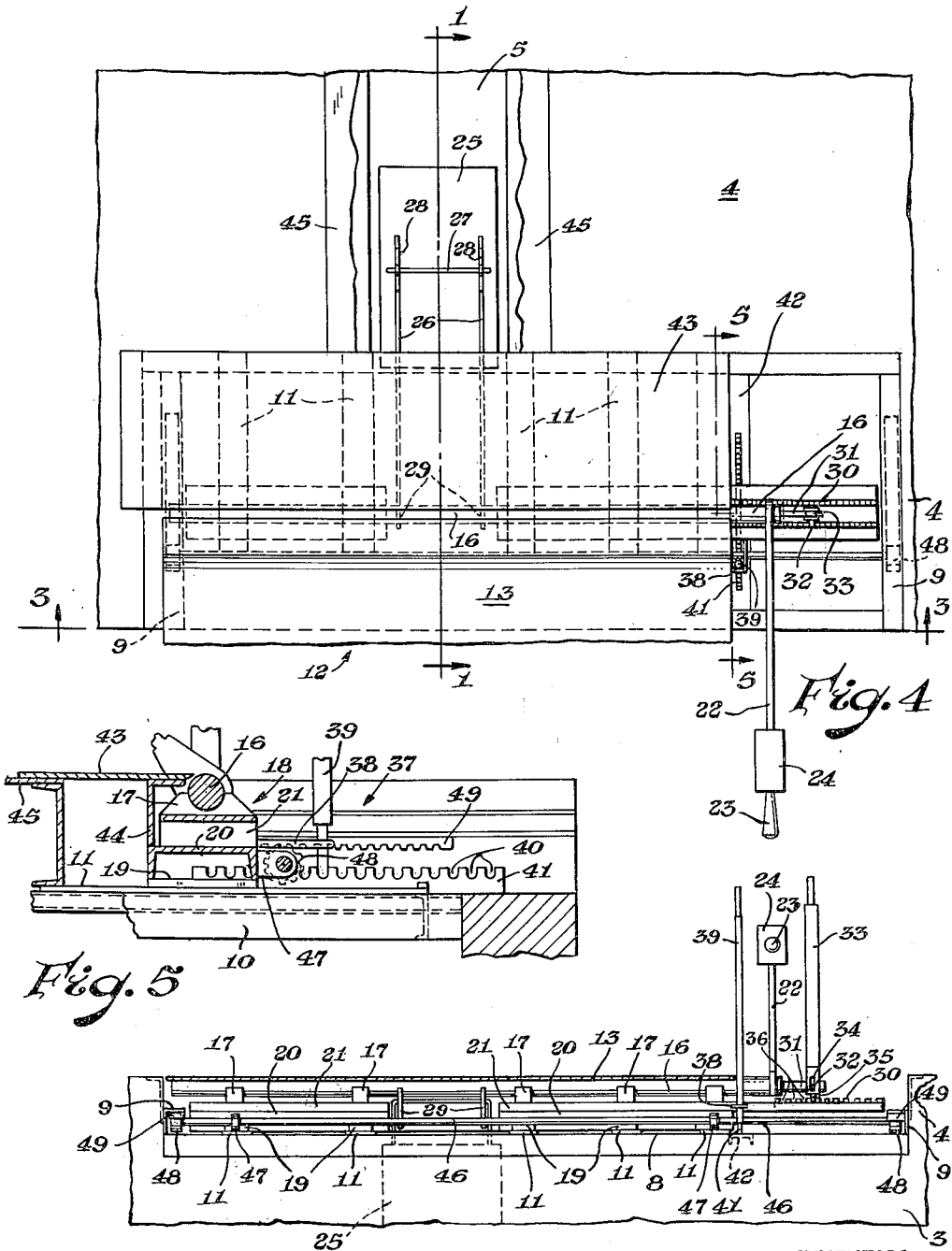

United States Patent Office 3,006,008
Patented Oct. 31, 1961

3,006,008
DOCK BOARD CONSTRUCTION USED AS SELF ADJUSTING BRIDGE BETWEEN TRUCK AND DOCK
Martin Loomis, Clare, and Leon M. Abbott, Sanford, Mich., assignors to Loomis Machine Company, Clare, Mich., a corporation of Michigan
Filed Oct. 12, 1956, Ser. No. 615,570
5 Claims. (Cl. 14—71)

This invention relates to a dockboard construction for use in conjunction with a loading dock to span the space or gap between the dock and a rail or motor vehicle to be loaded or unloaded at the dock.

Not infrequently the height of the vehicle to be loaded or unloaded does not correspond to the height of the dock, so one of the objects of the invention is to provide a dockboard construction which includes a ramp swingable about a horizontal axis so as to enable the forwardly projected end to be adjusted to the height of the vehicle. Moreover, it sometimes is inconvenient to locate the vehicle in such position that its material receiving and discharging opening corresponds exactly to the location of the ramp. Accordingly, another object of the invention is to provide a dockboard construction in which the ramp is capable of shifting movement from side to side relatively to the dock so that the ramp may be located in line with the material receiving and discharging opening of the vehicle.

For one reason or another, it is not always possible to position one vehicle at the same distance from the dock as other vehicles. Under such circumstances a loading ramp which may be suitable for use with the one vehicle may be either too short or too long to be used with another vehicle. Therefore, another object of the invention is to provide a dockboard construction in which the ramp is capable of being shifted fore and aft of the dock so as selectively to increase and decrease the distance the ramp may extend beyond the loading dock.

Another object of the invention is to provide a dockboard construction of the kind referred to which includes means for releasably locking the ramp in its raised, retracted position.

Other objects and advantages of the invention will be pointed out specifically or will become apparent from the following description when considered in conjunction with the appended claims and the accompanying drawings, in which:

FIGURE 1 is a side view partly in elevation and partly in section of apparatus constructed in accordance with the invention, the view being taken substantially along the line 1—1 of FIGURE 4;

FIGURE 2 is a view similar to FIGURE 1, but showing certain of the parts in positions different from their FIGURE 1 positions;

FIGURE 3 is a front view, partly in elevation and partly in section, the view being taken along the line 3—3 of FIGURE 4;

FIGURE 4 is a fragmentary top plan view of the apparatus;

FIGURE 5 is a fragmentary sectional detail of certain parts shown in FIGURES 1 and 2, but on a larger scale than the latter figures; and FIGURE 6 is a fragmentary detail view, partly in section and partly in elevation of the ramp locking apparatus.

Apparatus constructed in accordance with the invention comprises a loading dock 1 having a rear support or wall 2, a front wall or support 3, and a receiving surface 4 extending therebetween. The surface 4 is provided with an opening, substantially T-shaped in plan, leading into the space or pit 5 between the walls 2 and 3, the crossbar of the T being located towards the front support 3.

Extending forwardly from the support 2 are spaced, parallel angle or channel members 6 which define the leg of the T-shaped pit and which are secured at their forward ends to channel beams 7 which extend laterally towards the sides of the dock. As is best shown in FIGURE 3, the front support 3 is recessed so as to provide an upper surface 8 which is at a level lower than the level of the dock surface 4. At each end of the recess is secured one end of a rearwardly extending channel or angle member 9, the other end of which is fixed to the adjacent frame member 7. Also extending rearwardly from the front wall 3 is a plurality of frame members 10 on each of which is supported a smooth track element 11 for a purpose to be explained subsequently.

A ramp member 12 is included in the construction and comprises a rigid body or floor 13 having a plate or the like at two of its sides so as to provide upstanding guard rails 14. The plates also extend below the floor 13 as at 15 to provide supports upon which the ramp may rest when in loading or unloading position. The floor plate 13 extends rearwardly of the guard plates 14 and is welded or otherwise suitable secured to a cylindrical shaft 16 which is mounted for rocking and endwise movement in trunnion blocks 17 carried by mounting members 18. The mounting members include a plurality of base plates 19 located on either side of the leg of the T-shaped recess, and which rest on the trackway composed of the track elements 11. A downwardly facing channel member 20 is fixed to each of the base plates 19 and to each of the channel members is secured a member 21 on which the trunnion blocks 17 are mounted. Thus, the ramp 12 is mounted for swinging movement from an upper or raised position, as shown in FIGURE 2, to a lower position, as shown in FIGURE 1, and return, and the ramp and its mounting means are capable of being shifted fore and aft of the loading dock so as to vary the distance the ramp may extend beyond the dock.

Means is provided for rocking the ramp from and to its upper and lower positions and comprises a lever arm 22 fixed at one of its ends to the shaft 16 and having a handle 23 at its other end. The lever arm 22 also is provided with a counterweight 24 adjacent to its handle so as to maintain the lever in the position to which it has been moved. In order that the ramp 12 will remain in the position to which it has been rocked, a counterweight 25 is pivotally connected to corresponding ends of a pair of lever arms 26 by means of a U-shaped member 27 having its ends secured in the counterweight and having its bight extending through keepers 28 fastened to the arms 26. The other ends of the arms 26 are rigidly secured to links 29 or the like which in turn are rigidly secured as by welding or the like to the shaft 16 so that rocking of the shaft 16 by operation of the ramp swinging lever 22 will cause corresponding rocking of the counterweight arms 26. As is best shown in FIGURE 4, the counterweight 25 and its supporting arms are received in the rearwardly extending portion of the T-shaped pit 5.

At one side of the ramp member 12 there is provided means for shifting the ramp laterally or from side to side. As shown, the side shifting means comprises an extension 30 connected at one end to the ramp mounting means 18 and projecting beyond the side of the ramp so as to lie between the ramp and the adjacent dock surface 4. The shaft 16 also includes a laterally extending part 31 which carries a pin 32. A lateral shift lever 33 is mounted on the shaft part 31 and is provided with a hole 34 which receives the pin 32, thereby enabling the lever 33 to be moved vertically relatively to the shaft 31. At its lower end, the lever 33 is provided with a projection 35 which is adapted to be received in grooves 36 formed in the extension 30. To shift the ramp laterally, the lever 33 is lifted, rocked about the pin 32 and lowered, so as to locate the projection 35 in one of the grooves 36 which is not vertically below the shaft. Then with the projection 35 firmly seated in a groove, the shaft 33 is rocked in the opposite direction so as to shift the ramp 12 and its mounting shaft 16 endwise of the latter, the shaft 16 sliding in the trunnion blocks 17.

In the operation of the parts described thus far, the ramp 12 normally remains in the raised position shown in FIGURE 2 when not in use, and it will be noted that the ramp may be swung upwardly through an arc of such magnitude that its forward end is located rearwardly of the front wall 3 of the dock so as to prevent its being damaged by careless positioning of a truck or the like adjacent to the dock. When it is desired to load or unload a vehicle V such as a truck or railroad car, the vehicle is moved to such a position adjacent to the dock that the door or tailgate of the vehicle is as close as possible to being opposite the ramp. If the doorway or other opening into the vehicle is not perfectly aligned with the ramp, the ramp may be shifted laterally by operation of the lateral shifting lever 33 and its associated parts so as to avoid the necessity of relocating the vehicle. With the vehicle opening in a position to receive the ramp, the rocking lever may be swung clockwise, as viewed in FIGURES 1 and 2 so as to swing the ramp from its raised position to the lowered position shown in FIGURE 1, thereby bridging the gap between the dock and the vehicle.

Not all vehicles may be located the same distance away from the dock. For example, a railroad car may be able to be positioned either farther away from or closer to the dock than a truck can approach, and if a ramp is installed for use with one type of vehicle it may be inefficient or impracticable to use the same dockboard with vehicles of another kind. Therefore, apparatus constructed in accordance with the invention includes means indicated by the numeral 37 for shifting the ramp fore and aft of the dock so as to vary the distance the ramp may extend beyond the dock.

The fore and aft shifting means 37 comprises a projection 38 carried by the ramp mounting means 18 at one side of the ramp and having an opening for the accommodation of one end of a shift lever 39. The lower end of the shift lever 39 is shaped to be received in any one of a plurality of grooves or slots 40 formed in a forwardly and rearwardly extending part 41 rigidly secured to a frame element 42 spanning the front part of the pit 5. To advance or retract the ramp 12, the lever 39 is operated in a manner similar to the operation of the lateral shift lever 33, but will cause the ramp mounting means 18 to slide forwardly or rearwardly on the trackway 11, thereby selectively extending the ramp 12 a substantial distance from the support 3, as is shown in FIGURE 1, or retracting the ramp as is shown in FIGURE 2.

In the absence of a cover or the like, an opening into the pit 5 would appear behind the ramp floor when the ramp has been shifted forwardly. To prevent this from happening, a cover plate 43 which is shiftable with the ramp is provided. In the disclosed embodiment, the cover plate 43 is rigidly secured along its forward edge to a frame member 44 carried by the ramp mounting means 18. The cover plate is of sufficient width to span substantially the entire width of the pit 5, and is of sufficient length to span the distance from the rear end of the ramp to the forward end of the cover plate 45 which is secured to the frame part 6 and which covers the leg of the T-shaped pit opening. The cover plate 43 rests atop the cover plate 45 which spans the rear part of the pit and the cover 43 is slidable with respect to the plate 45.

As has been pointed out, the fore and aft ramp shifting lever is mounted at one side of the ramp. This is convenient for the operator since all operating levers are grouped at one location, but the application of shifting force to only one side of the ramp may cause the ramp to bind in the trackway. To prevent such an occurrence and to assure that the ramp will be extended and retracted easily, transmission means is included for transmitting shifting force applied at one side of the ramp to the other side. The transmission means comprises a shaft 46 journalled for rotation in bearings carried by lugs 47 fixed to the ramp mounting member 20, the shaft 46 having a pinion gear 48 keyed at each end thereof. The teeth of the pinions mesh with the teeth of racks 49 fixed to the underside of the overhanging flange of the adjacent frame member 9 so that any fore and aft movement imparted to the side of the ramp adjacent to the shift lever 39 will cause rotation of the adjacent pinion, which rotation will be imparted to the other pinion also through the interconnecting shaft 46. As a result, both sides of the ramp will move together.

In most tractor-trailer type vehicles, the doors of the trailer open outwardly. Thus, substantial clearance between the rear end of the trailer and a loading dock equipped with conventional ramps is required before the trailer doors can be opened, and the doors usually must be opened before the trailer is moved into loading or unloading position. Should a vehicle of this kind arrive at such a dock before it is open for business, the driver either must wait until it is open, or, if he cannot wait, he must open the doors of the trailer if the latter is to be left in position adjacent the dock. Either alternative is objectionable since the former results in a waste of the driver's time and the latter exposes the contents of the truck to pilfering. When a dock is equipped with a ramp constructed in accordance with the invention, however the trailer may have its doors closed and be spotted in position adjacent to the dock and, if desired, the tractor may be uncoupled from the trailer and be driven away. When the trailer is to be loaded or unloaded the retractability of the ramp 12 will enable the doors of the trailer to be opened without interference from the ramp, and the latter then may be extended, if necessary, to bridge any gap between the dock and the trailer.

When the dockboard is not in use, it may be desirable to anchor or lock the ramp in its raised position. One form of locking means is disclosed in FIGURE 6 and comprises a bracket 50 welded or otherwise suitably secured to the channel member 7 adjacent to the edge of the ramp member 12 which is next to the ramp raising and lowering arm 22. Adjacent to the upper end of the bracket 50 is pivotally mounted, by means of a nut and bolt assembly 51, a dog or lever 52. The dog extends in a fore and aft direction and is provided at its forward end with a latch member 53. The latch is adapted to embrace a rib 54 secured in any suitable manner on the shaft 16 in such position that, when the ramp member 12 is in its raised position, the rib 54 will be in its uppermost position.

When the locking means is used, the ramp member 12 may be moved to its retracted position shown in FIGURE 2, and then swung to its raised position. Preferably the nose of the latch part 53 is beveled as at 55 so that rotation of the shaft 16 and the rib 54 in a counterclockwise direction as viewed in FIGURE 6 will enable the rib automatically to raise the latch part out of the path of movement of the rib. The lever 52 is pivoted to one side of center, as shown, thereby enabling the latch part to fall after passage of the rib thereunder and embrace the rib so as securely to latch the ramp in raised position. The locking means not only locks the ramp in raised position, but also locks it in retracted position, as will readily be understood.

To release the locking means, it is necessary only to rock the lever counterclockwise and move the ramp either arcuately or forwardly. The rocking of the lever may be accomplished by the operator's stepping on the rear end 56 of the lever. When released, the lever will rock clockwise of its own accord so as to be in readiness for actuation by the rib.

The disclosed embodiment is representative of a presently preferred form of the invention, but it is intended to be illustrative rather than definitive of the invention. The invention is defined in the claims.

We claim:

1. In combination, a support; a ramp member having a forward end and a rearward end and adapted to bridge a gap between said support and a vehicle to be loaded or unloaded; means pivotally mounting said ramp member at its rearward end for swinging movements from a lowered position to a raised position, and return, and for side to side movements relative to said support; a supporting member supporting said mounting means on said support for movements of said supporting member relative to said support fore and aft of said ramp member; and shifting lever means operatively connected to one of said members for imparting fore and aft movements thereto.

2. The construction set forth in claim 1 including cooperable latch means on said support and on said mounting means operable to latch said ramp member in said raised position.

3. The construction set forth in claim 1 wherein said shifting lever means is operatively connected to said supporting member.

4. The construction set forth in claim 3 wherein said shifting lever means is at one side of said ramp member, and transmission means connected to said supporting member and extending laterally of said ramp member for transmitting to the other side of said ramp member fore and aft shifting force applied by said shifting lever means at said one side of said ramp member.

5. The construction set forth in claim 4 wherein said transmission means comprises a shaft journaled on said supporting means; a gear fixed to said shaft adjacent each end thereof; and a pair of toothed racks mounted on said support, one adjacent each gear and in mesh therewith.

References Cited in the file of this patent

UNITED STATES PATENTS

| | | |
|---|---|---|
| 486,552 | Zimmerman | Nov. 22, 1892 |
| 514,754 | Jessup | Feb. 13, 1894 |
| 630,879 | Franson et al. | Aug. 15, 1899 |
| 907,768 | Fromhart | Dec. 29, 1908 |
| 1,262,765 | Fontaine | Apr. 16, 1918 |
| 2,524,454 | Luther | Oct. 3, 1950 |
| 2,592,919 | Loomis et al. | Apr. 15, 1952 |
| 2,639,450 | Ramer | May 26, 1953 |
| 2,689,965 | Fenton | Sept. 28, 1954 |
| 2,709,410 | Fenton | May 31, 1955 |
| 2,714,735 | Watson | Aug. 9, 1955 |
| 2,750,609 | Jaseph | June 19, 1956 |
| 2,788,751 | Russell | Apr. 16, 1957 |